United States Patent
Kundu et al.

(10) Patent No.: US 11,763,196 B2
(45) Date of Patent: Sep. 19, 2023

(54) DYNAMICALLY APPLYING MACHINE LEARNING MODELS FROM PROFILING RECEIVED DATA

(71) Applicant: International Business Machines Corporation, Armonk, NY (US)

(72) Inventors: Sattwati Kundu, Bangalore (IN); Nair Raghunath Eledath, Bangalore (IN); Mansoor Ahmed, Bangalore (IN); Geetha Adinarayan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 16/829,224

(22) Filed: Mar. 25, 2020

(65) Prior Publication Data
US 2021/0304057 A1    Sep. 30, 2021

(51) Int. Cl.
*G06N 20/00*    (2019.01)
*G06N 5/02*    (2023.01)
*G06N 5/047*    (2023.01)

(52) U.S. Cl.
CPC .............. *G06N 20/00* (2019.01); *G06N 5/02* (2013.01); *G06N 5/047* (2013.01)

(58) Field of Classification Search
CPC ........... G06N 20/00; G06N 5/02; G06N 5/047
See application file for complete search history.

(56) References Cited

U.S. PATENT DOCUMENTS

| 9,245,235 B2 | 1/2016 | Chen et al. | |
| 10,200,457 B2 | 2/2019 | Shariat et al. | |
| 10,402,749 B2 | 9/2019 | Aminzadeh et al. | |
| 2019/0087744 A1 | 3/2019 | Schiemenz | |
| 2020/0057958 A1* | 2/2020 | Moore | G06N 20/20 |
| 2020/0311611 A1* | 10/2020 | Kennedy | G06N 3/08 |
| 2021/0201193 A1* | 7/2021 | Walters | G06N 3/0454 |

FOREIGN PATENT DOCUMENTS

IN    201811015053 A    10/2019

OTHER PUBLICATIONS

J. Brownlee, "Bagging and Random Forest Ensemble Algorithms for Machine Learning", Apr. 22, 2016 in Machine Learning Algorithms, https://machinelearningmastery.com/bagging-and-random-forest-ensemble-algorithms-for-machine-learning/, 6 pages.

* cited by examiner

*Primary Examiner* — Nhat Huy T Nguyen
(74) *Attorney, Agent, or Firm* — Edell, Shapiro & Finnan, LLC

(57) ABSTRACT

Methods, systems and computer readable media are provided for configuring machine learning systems to automatically and dynamically select a machine learning model based on statistical profiling of received data to improve machine learning applications for high variance data. Data is received from a system in operation. A profile is computed for the received data. A database comprising a plurality of stored profiles for a dataset is accessed, wherein each stored profile corresponds to a distinct pattern identified in the dataset. The computed profile is compared to each of the stored profiles to determine whether the computed profile matches one or more of the stored profiles. When one or more stored profiles match the computed profile, a matching profile is selected by the machine learning system. The received data is processed using a ML model associated with the matching profile.

20 Claims, 8 Drawing Sheets

DYNAMICALLY APPLYING MACHINE LEARNING MODELS FROM PROFILING RECEIVED DATA

TECHNICAL FIELD

Present invention embodiments relate to configuring machine learning systems to automatically and dynamically apply a machine learning model based on statistical profiling of received data to improve machine learning applications for high variance data.

DISCUSSION OF THE RELATED ART

Machine learning systems have wide applicability in a variety of fields. Recently, machine learning systems have been widely deployed in a variety of different technologies. However, deploying a reliable machine learning system in applications with high variance data is difficult, and often these systems do not meet desired performance criteria. For a machine learning system, the quality and characteristics of the training data impact how well the machine learning system performs once trained. For training data with high variability or inconsistent patterns, the quality of the machine learning model may be diminished, and in operation, the model may not consistently and reliably operate.

To improve model quality, ensemble and/or cross validation approaches have been used. However, these techniques do not retain detail of unique patterns in the underlying data set, effectively losing information. Additionally, high variability data may include a plurality of distinct patterns in the dataset, and may lead to a trained model that is not configured to recognize distinct patterns present in the original training data.

SUMMARY

According to embodiments of the present invention, methods, systems, and computer readable media are provided for profiling datasets and generating models from the profiled datasets. Received data may be analyzed, and matched to a generated profile comprising a model. Profiling of the dataset allows for distinct patterns to be identified in the dataset, and machine learning model predictions to be improved.

Methods, systems and computer readable media are provided for configuring machine learning systems to automatically and dynamically apply a machine learning model based on statistical profiling of received data to improve machine learning applications for high variance data. Data is received from a system in operation. A profile is computed for the received data. A database comprising a plurality of stored profiles for a dataset is accessed, wherein each stored profile corresponds to a distinct pattern identified in the dataset. The computed profile is compared to each of the stored profiles to determine whether the computed profile matches one or more of the stored profiles. When one or more stored profiles match the computed profile, a matching profile is selected by the machine learning system. The received data is processed using a machine learning (ML) model associated with the matching profile.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

In classic machine learning approaches, the machine learning system is trained with data acquired over a specified period of time (e.g., the training length of the data). However, characteristics of a physical system producing a dataset may change. For example, a component (e.g., a sensor, controller, etc.) may be removed, added or replaced, operating conditions or operating demands may change throughout the day, etc. which may alter the characteristics of the data being produced. In some cases, as the training dataset changes, this training data is no longer optimal for training a machine learning system as the data no longer reflects the current state of the system. For example, a sensor or other component of a system may be changed, and the training data collected with the original sensor or component may be different from or have a different signature than the data collected with the replacement sensor or component. Thus, the data acquired prior to the sensor change no longer reflects the state of the modified system, and therefore, the data is no longer optimal for training the system.

Present techniques automatically and dynamically identify datasets that are compatible with an underlying system, in cases in which the underlying parameters (e.g., a change in sensors, a change in calibration, etc.) of the system may change as a function of time. These techniques use different training sets with different underlying models to manage this variation. By matching a profile for received data to a corresponding stored profile, an optimal machine learning model may be selected and applied.

Figure 1A:
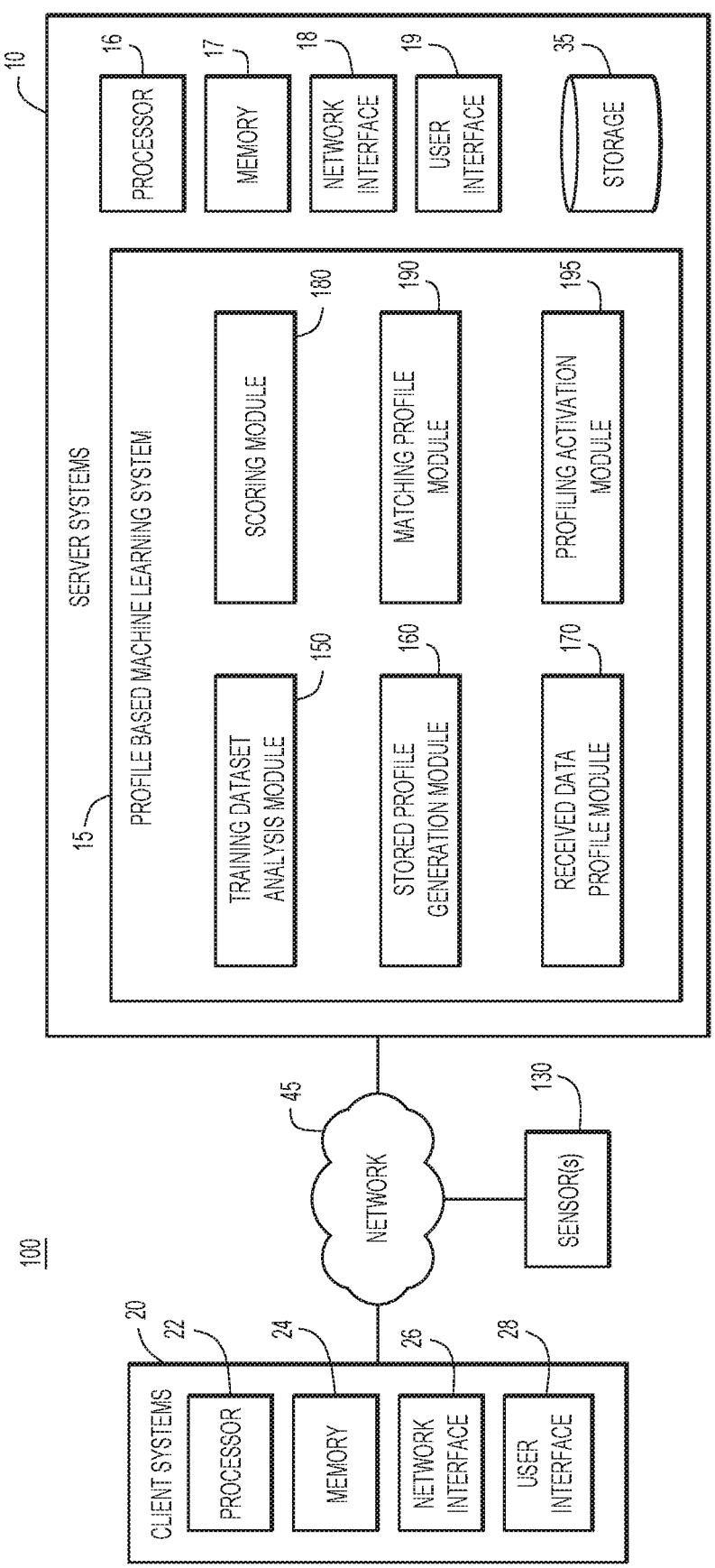
FIG. 1A is a diagrammatic illustration of an example computing environment for profile based machine learning systems, according to an embodiment of the present invention.

An example environment for use with present invention embodiments is illustrated in FIG. 1A. Specifically, the environment includes one or more server systems 10, one or more client or end-user systems 20, and a network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20, may be local to each other, and may communicate via any appropriate local communication medium, such as local area network (LAN), hardwire, wireless link, Intranet, etc. In aspects, one or more sensors 130 may be integrated into a system (e.g., manufacturing system, power system, electro-mechanical system, bioreactor, etc.) and may obtain data (e.g., time series data, image data, etc.) to provide to server systems 10 via network 45.

Client systems 20 enable users to receive information from server systems 10, and to access the output of the profile-based machine learning system operating on server systems 10.

Server systems 10 may comprise or have access to a storage database 35 that may store various types of information for profile-based machine learning systems. For example, server systems 10 may store training data, received (operational) data, profiles, profile scores, etc. in storage 35. Storage database 35 may include any suitable information in a structured, semi-structured, or unstructured format.

Storage database 35 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface 28, such as a GUI, etc., or other interface, such as command line prompts, menu screens, etc., to obtain information pertaining to user interactions with the system, and may allow a user to obtain results of the profile based machine learning system in operation, as well as to configure the profile based machine learning system.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, profile based machine learning system, browser/interface software, etc.). By way of example, the server/client includes at least one processor 16, 22 one or more memories 17, 24 and/or internal or external network interfaces or communications devices 18, 26, such as a modem or network cards, and a user interface 19, 28, etc. The optional input devices may include a keyboard, mouse, or other input device.

Alternatively, one or more client systems 20 may perform the operations of server systems 10 in a stand-alone mode of operation. For example, the client system may store or have access to the data stored in storage 35 as well as the profile based machine learning system 15. The client system may provide results of the profile based machine learning system to a user as well as allow the user to configure the profile based machine learning system. The graphical user or other interface 28, such as a GUI, command line prompts, menu screens, etc., may obtain information pertaining to user interactions with the system, which may be used for accessing results of profile based machine learning system.

Profile based machine learning system 15 may include one or more modules or units to perform the various functions of present invention embodiments described herein. The various modules (e.g., profile based machine learning system 15, including training dataset analysis module 150, stored profile generation module 160, received data profile module 170, scoring module 180, matching profile module 190, and profiling activation module 195, etc.), may be implemented by any combination of any quantity of software and/or hardware modules or units, and may reside within memory 17 of the server for execution by processor 16. These modules are described in additional detail below.

Training dataset analysis module 150 may apply change-point detection or other statistical techniques such as edge detection to identify distinct patterns in the data for which profiles may be generated.

Stored profile generation module 160 receives the output of the training dataset analysis module 150. This module analyzes the portion of the data corresponding to an identified distinct pattern and generates a profile based upon this portion of the data. Stored profile generation module 160 may select a machine learning model along with hyperparameters, which may be adjusted during the training process. Hyperparameters may include parameters such as number of inputs, number of nodes, number of layers, number of outputs, etc. The profile may also include statistical characteristics of the portion of the data. Thus, this module generates a profile, including a machine learning model trained on a data pattern, with a signature comprising statistical parameters that is specific to the identified pattern. These techniques are compatible with any suitable machine learning algorithm, including decision trees, random forest, neural nets, deep learning, logistic regression, etc.

Received data profile module 170 analyzes received data to determine whether or not the profile of the received data matches one or more of the stored profiles. In some aspects, the profile score of the received data may be compared to one or more stored profile scores of the identified patterns to determine if the profiles match.

Scoring module 180 generates a profile score for a portion or set of data. The profile score may be based upon one or more statistical parameters.

Matching profile module 190 determines whether or not the profile score from the received data matches one or more of the stored profile scores, e.g., whether the profile score for the received data is within a threshold value of one or more stored profile scores. Typically, the closest stored profile will be selected if there are multiple stored profiles falling within the threshold value for matching the profile score for the received data.

Profiling activation module 195 may determine whether or not data profiling by the profile based machine learning system 15 is activated. In some aspects, this determination is based on the variability of the training data set.

Figure 1B:
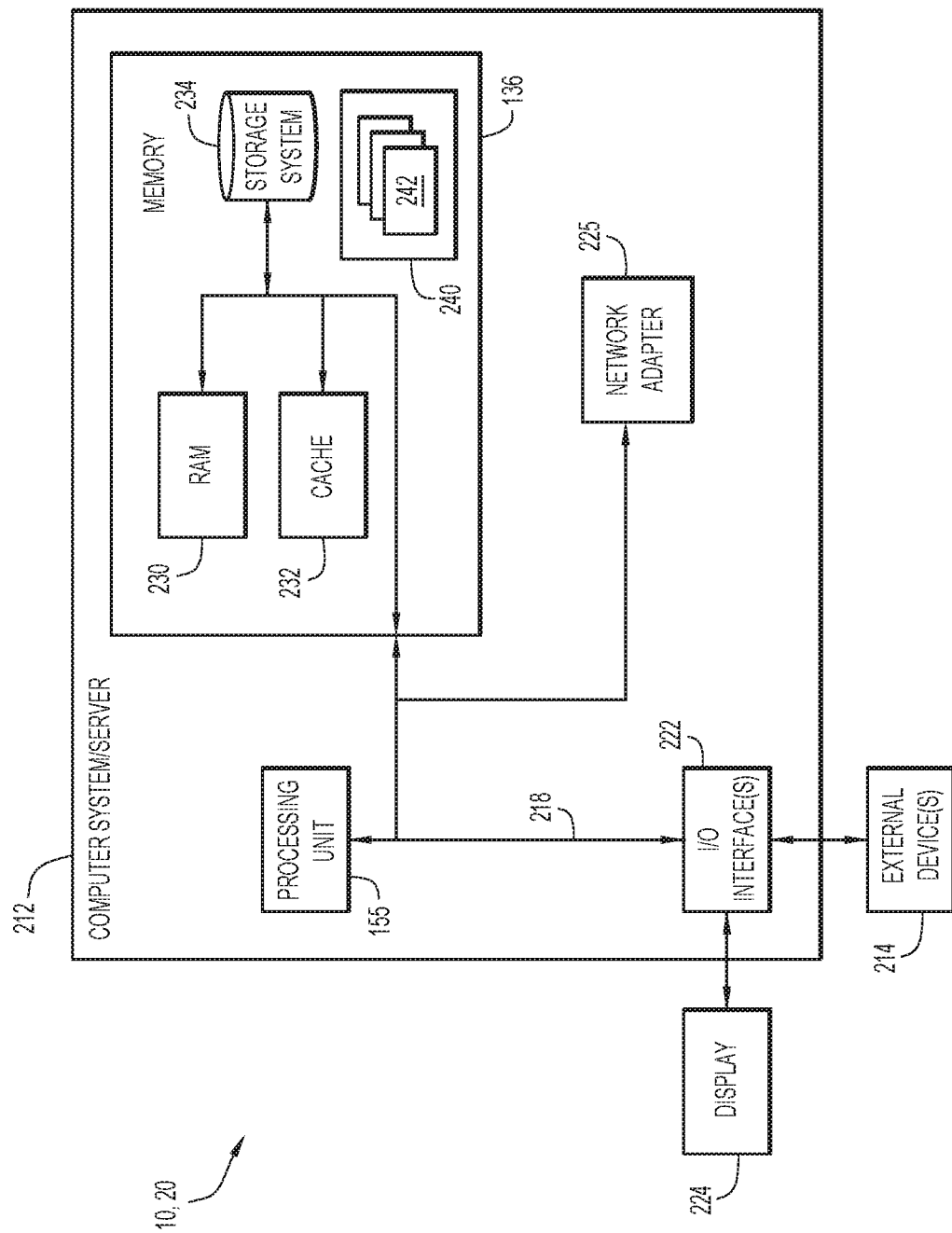
FIG. 1B is an example computing device for the computing environment of FIG. 1, according to an embodiment of the present invention.

Client systems 20 and server systems 10 may be implemented by any suitable computing device, such as computing device 212 shown in FIG. 1B for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., profile based machine learning system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., profile based machine learning system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 2:
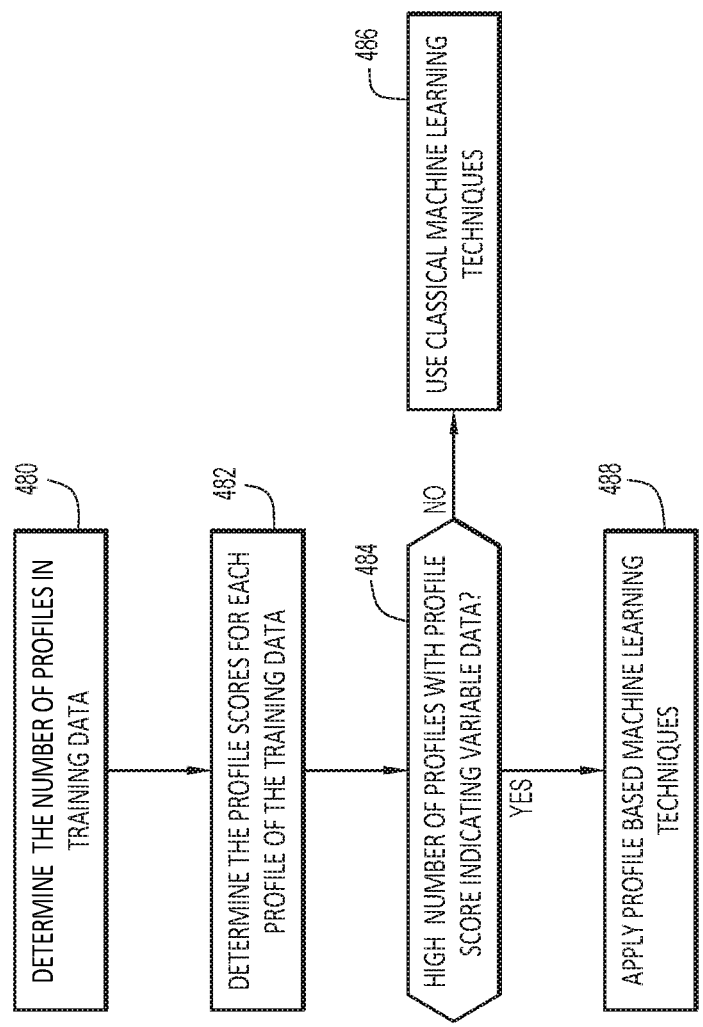
FIG. 2 is an illustration showing evaluation of a training dataset to determine whether to trigger the profile based machine learning system, according to an embodiment of the present invention.

FIG. 2 shows a flowchart for determining when data profiling is triggered. In general, this approach is used when the training data has a high number of profiles and/or profile scores that indicate the data is highly variable. At operation 480, a number of profiles for the training data are determined. At operation 482, the profile scores for each profile of the training data is determined. At operation 484, if the number of profiles exceeds a threshold number and/or if the corresponding profile scores exceed a profile score threshold indicating high variance data, then at operation 488, profile based machine learning techniques are applied as provided herein. Otherwise, at operation 486, the variability of the training data does not justify application of the techniques provided herein, and classical machine learning techniques are used.

As part of classical machine learning techniques, a ML model may be trained using a dataset that has not been divided into profiles, and does not have high variability.

FIGS. 3-6 show aspects of dataset analysis, profile generation, and of utilizing the profile based machine learning system in operation. By way of example, the training dataset shown in FIGS. 3-6 is a time series showing multiple signal patterns. In this example, the dataset represents a time series having an x-axis that represents time stamps and/or datasets and a y-axis that is a corresponding value for that timestamp and/or dataset. While this example corresponds to time series data (serial acquisition of data as a function of time), present embodiments are not intended to be limited to timestamp data and may be applied to other types of data as well, such as imaging data.

Additionally, FIGS. 3-6 refer to statistical techniques suitable for operating on time series data, such as changepoint detection. This technique may be used to identify pattern changes in the dataset, such as a time point at which a characteristic of a stochastic process changes. While this example corresponds to changepoint detection, present embodiments are not intended to be limited to this technique. In other aspects, edge detection may be used to detect changes in image segmentation. Present techniques should not be limited to a specific statistical technique, as any suitable statistical technique may be used.

Distinct data profiles of a dataset may be identified across historical data. For example, a data set is analyzed for different patterns, and a profile is generated for each identified distinct pattern. Based on characteristics of received data, the system selects the profile that corresponds to the signature or profile of the received data.

Figure 3:
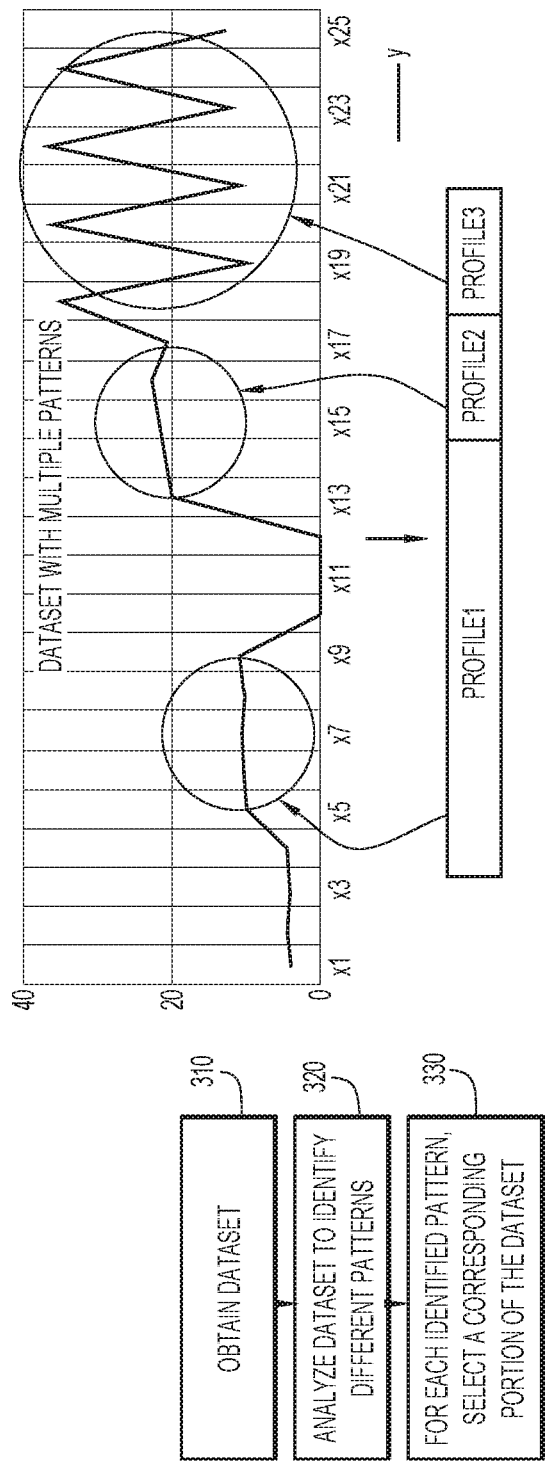
FIG. 3 is an illustration showing operations for identifying distinct patterns in a dataset, according to an embodiment of the present invention.

FIG. 3 shows identification of different distinct patterns in a dataset (e.g., historical data) to generate different models trained with different portions of training data.

At operation 310, a dataset is obtained. The dataset may be obtained for a predetermined length of time, and may be used to train a machine learning system. At operation 320, the dataset may be analyzed to identify different patterns in an automated manner. In this example, three patterns are identified, as shown by respective circles. In this example, changepoint detection is used to identify pattern changes in the dataset (e.g., time series data). For example, changepoint detection may be used to identify a time point at which a characteristic of a stochastic process has changed. For example, in this example, ×5, ×9, ×13, and ×17 (e.g., corresponding to time and/or a dataset that was obtained) would be a changepoint.

At operation 330, for each identified pattern, a corresponding portion of the data set is selected. Each selected portion is used to generate a profile as described with respect to FIG. 4.

Figure 4:
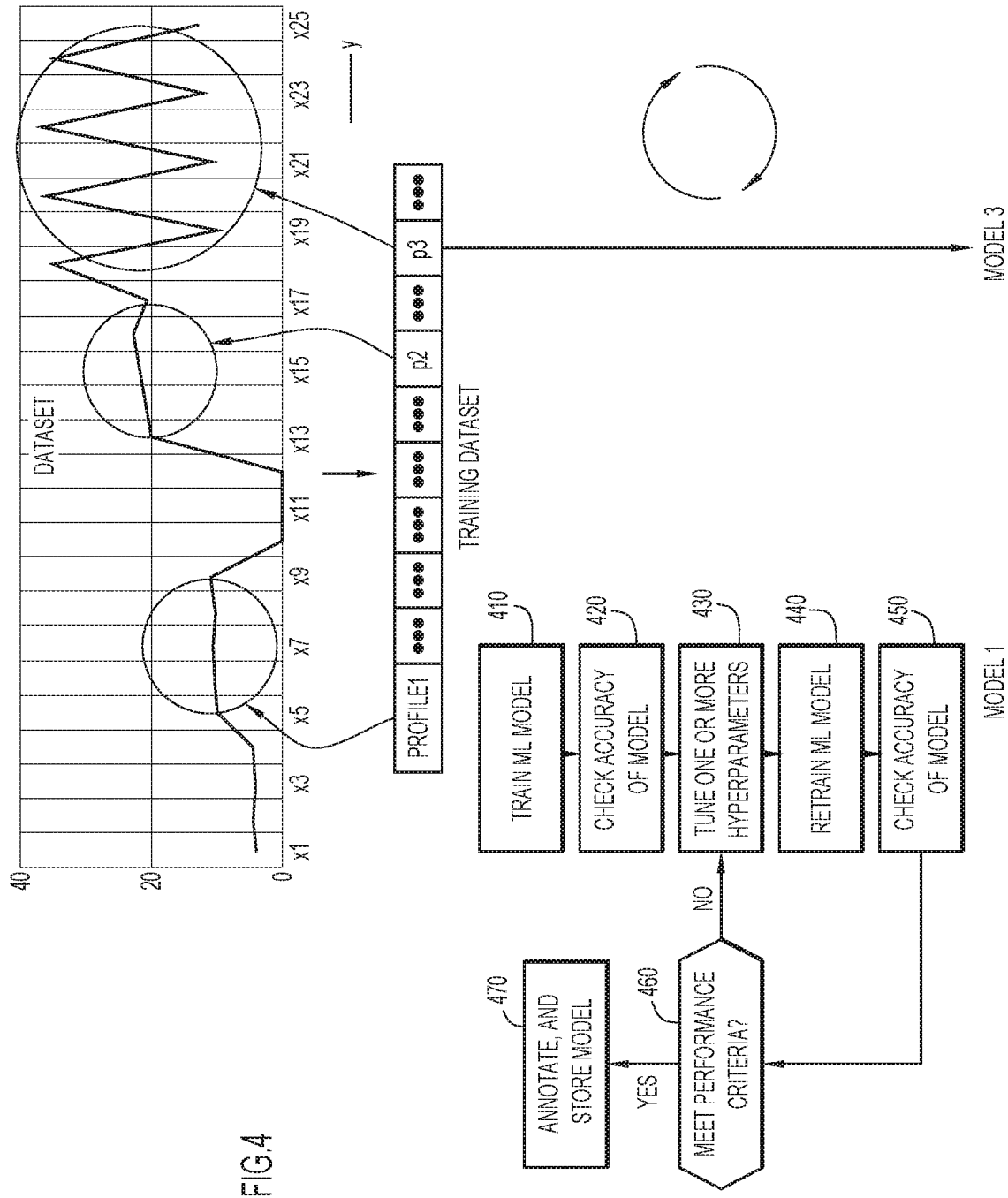
FIG. 4 is an illustration showing generation of profiles for a dataset, according to an embodiment of the present invention.

FIG. 4 shows a flowchart for generating a ML model for each profile.

At operation 410, a ML model is trained with the identified data (e.g. a profile including a portion of the data corresponding to an identified pattern). At operation 420, the accuracy of the ML model is determined to validate the model. It is presumed that the model does not initially meet desired criteria and further optimization will be performed. At operation 430, one or more hyperparameters are tuned to improve performance of the ML model. At operation 440, the ML is retrained. At operation 450, the accuracy of the model is determined. If the model meets performance criteria, at operation 460, the model may be annotated and stored in a database. Otherwise, the process may continue to operation 430 for further training. This process may be repeated for each distinct profile to compute a plurality of profiles with corresponding trained ML models, tailored to data having a characteristic pattern or signature.

Between two changepoints, the properties of that section of the dataset are determined (e.g., including, but not limited to, mean, std dev, min, max, median, etc.) and tagged against the portion of the dataset. This process is repeated for all sections of the dataset. Using this approach, each section of the training dataset is tagged with a different profile. In some cases, multiple sections of the dataset may be tagged with the same profile. Each profile may be stored in storage database 35.

Thus, each profile may be annotated, corresponding to a particular ML model, and associated with distinct statistical properties for that portion of the dataset. The profiles may be stored in a database.

Figure 5:
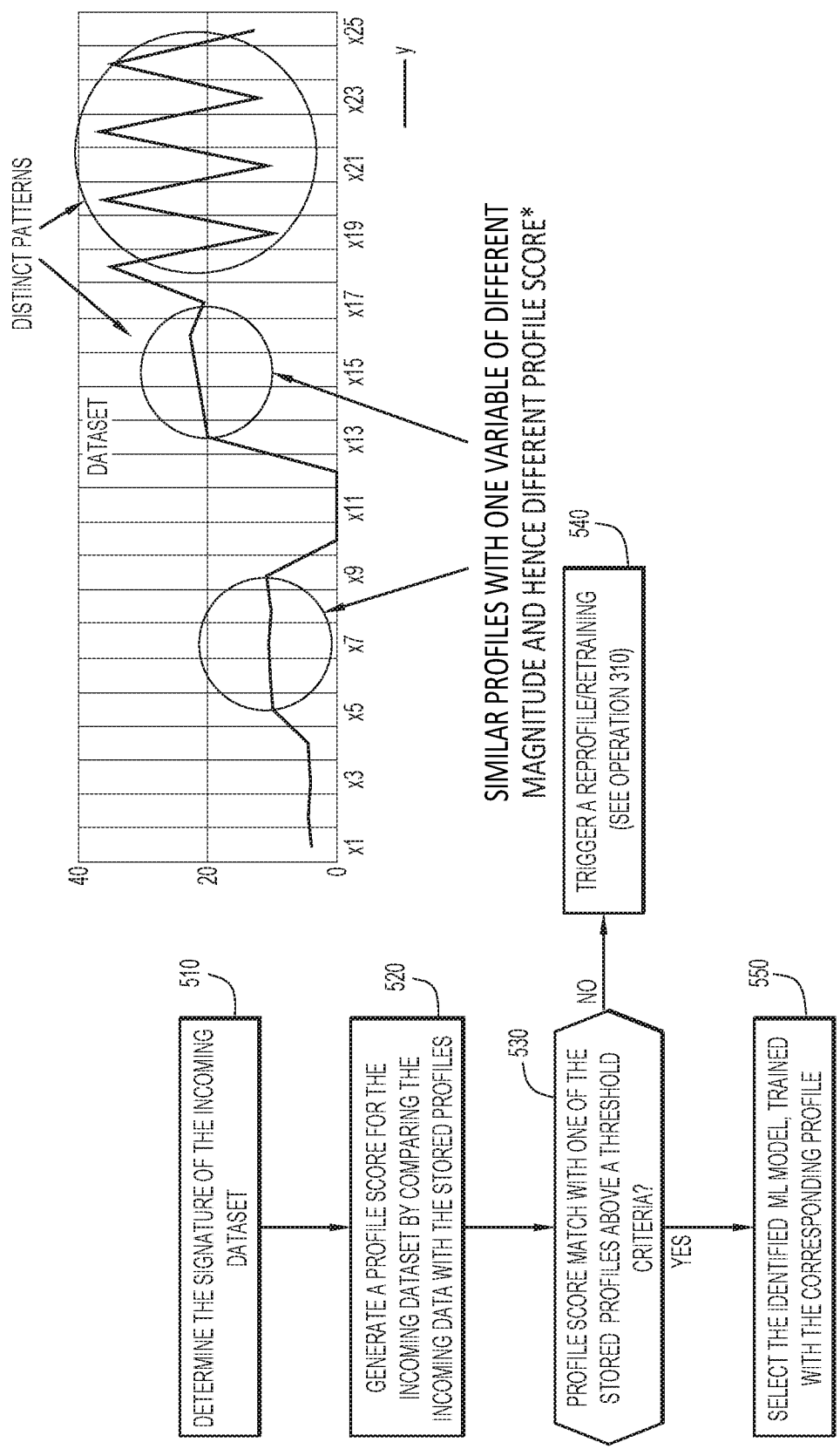
FIG. 5 is an illustration showing profile based machine learning systems in operation, according to an embodiment of the present invention.

FIG. 5 shows selection and utilization of a ML model, trained with a profile that is triggered by incoming data. At operation 510, the signature or profile score of the incoming dataset is determined. In some cases, the profile score may reflect the entire incoming dataset, while in other cases, the incoming dataset may be subject to a statistical technique such as changepoint detection, and a profile score for each section between changepoints is compared to stored profile data. In other cases, the incoming dataset is limited with respect to time, such that a specified amount of incoming data is utilized for the analysis.

At operation 520, the profile score is generated for the incoming dataset by comparing the incoming dataset with each of the stored profiles (e.g., created during the training process). Similar profiles with one variable of different magnitude will have a different profile score. Profile scores are based on one or more statistical properties of the corresponding portion of the dataset (e.g., mean, std dev, min, max, median, etc.).

At operation 530, the profile score is matched with one of the stored profiles, above a threshold criteria. The threshold criteria is indicative of a measure of similarity between the signature of the incoming data (profile score for received data) and the signatures of the stored profile (generated from training data). For multiple profile scores within a threshold, the closest matching profile is typically selected.

At operation 550, the profile score is determined to be within the threshold criteria, and the corresponding trained ML model is invoked for operating on the received dataset.

Otherwise, if the profile score is determined to be outside the threshold criteria, there is no matching profile. In this case, the incoming data profile score does not match any of the stored profiles from the database, and the new dataset is flagged as an untagged profile. When a dataset is flagged as untagged, this triggers a re-profiling of the training dataset as well as creation of multiple ML models against each of the newly created profiles in an effort to identify a suitable match, as shown at operation 540.

Accordingly, the system is configured to intelligently and dynamically select and apply a ML model, tailored to the characteristics of the received data, based on stored profiles generated by training data. Using these techniques, once a profile is matched based on a profile score, a corresponding trained ML learning model that is suitable for operation on that dataset is selected and utilized.

Figure 6:
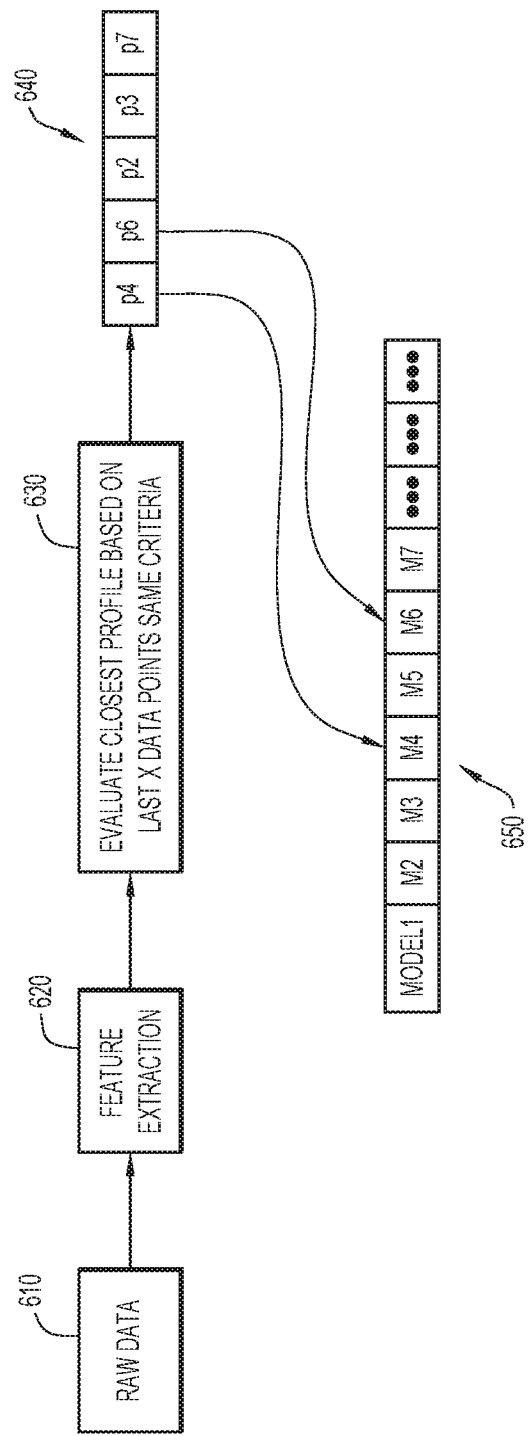
FIG. 6 is an illustration showing matching computed profiles from raw data to stored profiles by the profile based machine learning system, according to an embodiment of the present invention.

FIG. 6 shows a graphical illustration of matching incoming data to a stored profile, allowing the system to intelligently and dynamically select and utilize a corresponding ML model for the incoming data. In this example, there are a plurality of models (M1-M7, etc.), with each model corresponding to a stored profile.

At operation 610, the incoming raw data is received and at operation 620, the received data undergoes feature extraction. In aspects, feature extraction may include identification of one or more patterns.

At operation 630, the statistical properties of the raw data (e.g., profile score of the incoming data) may be compared to the statistical properties of each stored profile (e.g., portion of a dataset) based on profile scores. For example, a profile score may be determined for data between two changepoints, such that the properties of the dataset (e.g., including, but not limited to, mean, std dev, min, max, median, etc.) are determined and combined to form a profile score. In some aspects, the incoming data is evaluated using the same criteria as applied to the training dataset during training of the ML models.

The profile score is compared with each of the profiles (e.g., p4, p6, p2, p3 and p7) in the database (created during the training process) at operation 640 to identify a matching profile. At operation 650, the corresponding ML model is identified. If the received data changes, a different model with different hyperparameters may be selected. In this example, if p4 is determined to be the closest match, the model M4 would be selected as the corresponding ML trained model, and model M4 is used to process the incoming data.

Figure 7:
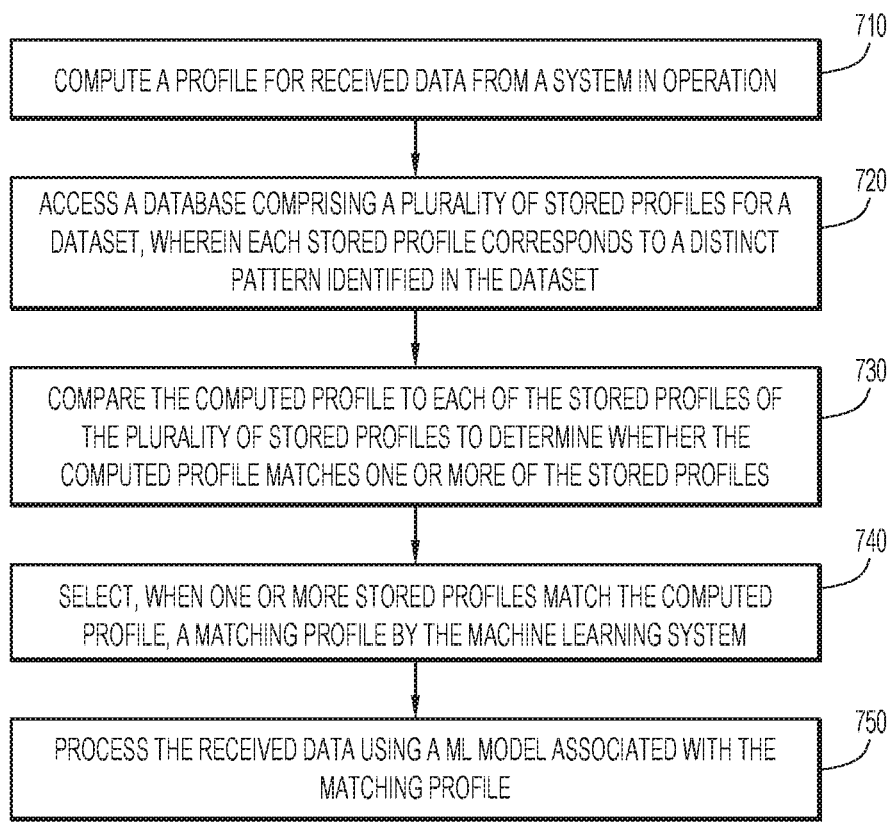
FIG. 7 shows a high level flowchart of operations for dynamically selecting a profile by a profile based machine learning system, according to an embodiment of the present invention.

FIG. 7 is an operational flow chart showing high level operations of the techniques provided herein. At operation 710, data is received from a system in operation and a profile is computed for the received data. At operation 720, a database comprising a plurality of stored profiles for a dataset is accessed, wherein each stored profile corresponds to a distinct pattern identified in the dataset. At operation 730, the computed profile is compared to each of the stored profiles of the plurality of stored profiles to determine whether the computed profile matches one or more of the stored profiles. At operation 740, when one or more stored profiles match the computed profile, a matching profile is selected by the machine learning system. At operation 750, the received data is processed using a ML model associated with the matching profile.

These techniques may be especially suitable for power generation and supply applications as well as computing load applications. For example, power demand may fluctuate based upon the time and day of the week, and may be linked to special events that may increase or decrease power demand. Accordingly, the power data may be profiled to develop better models for particular times, days, and events.

Present techniques provide an improvement to the field of machine learning, and in particular, to training and operation of machine learning systems in environments with variable data. By identifying variation in data, and developing models tuned to specific profiles accounting for particular types of data variation, performance of machine learning models (e.g., prediction accuracy) may be improved. In particular, a dataset profile may be leveraged to build a machine learning model tuned specifically for a portion of the dataset corresponding to the profile. Such techniques lead to improvements in the processing capabilities of machine learning systems, providing improved accuracy and performance. Further, by using reduced and focused training sets, the ML models may be trained significantly faster to thereby consume less processing resources to improve computing performance.

These techniques may be applied to a wide variety of environments, including power consumption, computing resources, manufacturing processes, or any other environment in which characteristics of data may change over time or space.

It will be appreciated that the embodiments described above and illustrated in the drawings represent only a few of the many ways of implementing embodiments for using data profiling to improve data processing by machine learning systems.

The environment of the present invention embodiments may include any number of computer or other processing systems (e.g., client or end-user systems, server systems, etc.) and databases or other repositories arranged in any desired fashion, wherein the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile based machine learning system, etc.). These systems may include any type of monitors and input devices (e.g., keyboard, mouse, voice recognition, etc.) to enter and/or view information.

It is to be understood that the software (e.g., profile based machine learning system 15, training dataset analysis module 150, stored profile generation module 160, received data profile module 170, scoring module 180, matching profile module 190, and profiling activation module 195, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., profile based machine learning system 15, training dataset analysis module 150, stored profile generation module 160, received data profile module 170, scoring module 180, matching profile module 190, and profiling activation module 195, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., profiles, scores, statistical parameters, received datasets, training datasets, etc.). The database system may be implemented by any number of any conventional or other databases, data stores or storage structures (e.g., files, databases, data structures, data or other repositories, etc.) to store information (e.g., profiles, scores, statistical parameters, received datasets, training datasets, etc.). The database system may be included within or coupled to the server and/or client systems. The database systems and/or storage structures may be remote from or local to the computer or other processing systems, and may store any desired data (e.g., profiles, scores, statistical parameters, received datasets, training datasets, etc.).

The present invention embodiments may employ any number of any type of user interface (e.g., Graphical User Interface (GUI), command-line, prompt, etc.) for obtaining or providing information (e.g., profiles, scores, statistical parameters, received datasets, training datasets, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output may include any information arranged in any fashion, and may be configurable based on rules or other criteria to provide desired information to a user (e.g., output of the machine learning system and arrangement thereof, etc.).

The present invention embodiments are not limited to the specific tasks or algorithms described above, but may be utilized for any machine learning application in which data is variable. Further, this approach may be generally applicable to providing information in any context, and is not limited to any particular application domain, such as computing services, power plants, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method utilizing a machine learning system for processing data comprising:
    identifying a plurality of unique patterns in a dataset and generating a profile for each identified unique pattern;
    determining that the dataset is a variable dataset based on a number of profiles for the identified unique patterns satisfying a threshold;
    training a plurality of machine learning models each for a corresponding identified unique pattern with data from the dataset associated with the corresponding unique pattern;
    computing a profile for data received from a corresponding system in operation, wherein the computed profile of the received data corresponds to a distinct pattern in the received data;
    accessing a database comprising a plurality of stored profiles for the dataset, wherein each stored profile corresponds to a unique pattern identified in the dataset and a machine learning model of the plurality of machine learning models previously trained for the unique pattern;
    comparing the computed profile of the received data to each of the stored profiles of the plurality of stored profiles;
    selecting a matching profile from the plurality of stored profiles based on comparing the computed profile of the received data to each of the stored profiles; and
    processing the received data using the previously trained machine learning model corresponding to the matching profile to produce predictions pertaining to operation of the corresponding system.

2. The method of claim 1, further comprising:
    processing the received data according to classical machine learning techniques, when a number of the stored profiles does not exceed a threshold number, or profile scores corresponding to the stored profiles do not exceed a threshold value indicating variable data.

3. The method of claim 1, wherein a stored profile comprises one or more hyper-parameters for a machine learning model corresponding to an identified pattern in the dataset.

4. The method of claim 1, further comprising:
    determining whether the computed profile of the received data matches a stored profile by comparing a first score comprising an aggregate of statistical parameters corresponding to the computed profile of the received data to a second score comprising an aggregate of statistical parameters corresponding to a stored profile.

5. The method of claim 4, wherein the aggregate of statistical parameters includes one or more of a standard deviation, a mean, a minimum, a maximum, and a median.

6. The method of claim 1, further comprising:
    identifying a portion of a dataset corresponding to an identified pattern;
    training a machine learning model with the portion of the dataset, wherein hyper-parameters of the machine learning model trained with the portion of the dataset are adjusted to reach performance criteria;
    computing statistical criteria for the dataset with the identified portion; and
    storing the machine learning model trained with the portion of the dataset and the hyper-parameters along with corresponding statistical criteria as a profile.

7. The method of claim 1, further comprising:
    annotating a training dataset with the stored profiles for that training dataset.

8. The method of claim 1, further comprising:
repeating profiling of the received data when the computed profile of the received data does not match any stored profile.

9. A computer system for utilizing a machine learning system for processing data, the computer system comprising:
one or more computer processors;
one or more computer readable storage media;
program instructions stored on the one or more computer readable storage media for execution by at least one of the one or more computer processors, the program instructions comprising instructions to:
identify a plurality of unique patterns in a dataset and generate a profile for each identified unique pattern;
determine that the dataset is a variable dataset based on a number of profiles for the identified unique patterns satisfying a threshold;
train a plurality of machine learning models each for a corresponding identified unique pattern with data from the dataset associated with the corresponding unique pattern;
compute a profile for data received from a corresponding system in operation, wherein the computed profile of the received data corresponds to a distinct pattern in the received data;
access a database comprising a plurality of stored profiles for the dataset, wherein each stored profile corresponds to a unique pattern identified in the dataset and a machine learning model of the plurality of machine learning models previously trained for the unique pattern;
compare the computed profile of the received data to each of the stored profiles of the plurality of stored profiles;
select a matching profile from the plurality of stored profiles based on comparing the computed profile of the received data to each of the stored profiles; and
process the received data using the previously trained machine learning model corresponding to the matching profile to produce predictions pertaining to operation of the corresponding system.

10. The computer system of claim 9, wherein the program instructions further comprise instructions to:
process the received data according to classical machine learning techniques, when a number of the stored profiles does not exceed a threshold number, or profile scores corresponding to the stored profiles do not exceed a threshold value indicating variable data.

11. The computer system of claim 9, wherein a stored profile comprises one or more hyper-parameters for a machine learning model corresponding to an identified pattern in the dataset.

12. The computer system of claim 9, wherein the program instructions further comprise instructions to:
determine whether the computed profile of the received data matches a stored profile by comparing a first score comprising an aggregate of statistical parameters corresponding to the computed profile of the received data to a second score comprising an aggregate of statistical parameters corresponding to a stored profile.

13. The computer system of claim 9, wherein the program instructions further comprise instructions to:
identify a portion of a dataset corresponding to an identified pattern;
train a machine learning model with the portion of the dataset, wherein hyper-parameters of the machine learning model trained with the portion of the dataset are adjusted to reach performance criteria;
compute statistical criteria for the dataset with the identified portion; and
store the machine learning model trained with the portion of the dataset and the hyper-parameters along with corresponding statistical criteria as a profile.

14. The computer system of claim 9, wherein the program instructions further comprise instructions to:
repeat profiling of the received data when the computed profile of the received data does not match any stored profile.

15. A computer program product for utilizing a machine learning system for processing data, the computer program product comprising one or more computer readable storage media collectively having program instructions embodied therewith, the program instructions executable by a computer to cause the computer to:
identify a plurality of unique patterns in a dataset and generate a profile for each identified unique pattern;
determine that the dataset is a variable dataset based on a number of profiles for the identified unique patterns satisfying a threshold;
train a plurality of machine learning models each for a corresponding identified unique pattern with data from the dataset associated with the corresponding unique pattern;
compute a profile for data received from a corresponding system in operation, wherein the computed profile of the received data corresponds to a distinct pattern in the received data;
access a database comprising a plurality of stored profiles for the dataset, wherein each stored profile corresponds to a unique pattern identified in the dataset and a machine learning model of the plurality of machine learning models previously trained for the unique pattern;
compare the computed profile of the received data to each of the stored profiles of the plurality of stored profiles;
select a matching profile from the plurality of stored profiles based on comparing the computed profile of the received data to each of the stored profiles; and
process the received data using the previously trained machine learning model corresponding to the matching profile to produce predictions pertaining to operation of the corresponding system.

16. The computer program product of claim 15, wherein the program instructions further cause the computer to:
process the received data according to classical machine learning techniques, when a number of the stored profiles does not exceed a threshold number, or profile scores corresponding to the stored profiles do not exceed a threshold value indicating variable data.

17. The computer program product of claim 15, wherein a stored profile comprises one or more hyper-parameters for a machine learning model corresponding to an identified pattern in the dataset.

18. The computer program product of claim 15, wherein the program instructions further cause the computer to:
determine whether the computed profile of the received data matches a stored profile by comparing a first score comprising an aggregate of statistical parameters corresponding to the computed profile of the received data to a second score comprising an aggregate of statistical parameters corresponding to a stored profile.

19. The computer program product of claim 15, wherein the program instructions further cause the computer to:

identify a portion of a dataset corresponding to an identified pattern;

train a machine learning model with the portion of the dataset, wherein hyper-parameters of the machine learning model trained with the portion of the dataset are adjusted to reach performance criteria;

compute statistical criteria for the dataset with the identified portion; and store the machine learning model trained with the portion of the dataset and the hyper-parameters along with corresponding statistical criteria as a profile.

20. The computer program product of claim 15, wherein the program instructions further cause the computer to:

repeat profiling of the received data when the computed profile of the received data does not match any stored profile.

* * * * *